United States Patent [19]
Simon et al.

[11] Patent Number: 5,629,694
[45] Date of Patent: May 13, 1997

[54] COMPUTER KEYBOARD WITH POWER CONTROL KEY

[75] Inventors: Jean-Jacques Simon, Bresson; Francois Loison, Grenoble, both of France

[73] Assignee: Hewlett-Packard Company, Palo Alto, Calif.

[21] Appl. No.: 565,547

[22] Filed: Nov. 30, 1995

[30] Foreign Application Priority Data

Jan. 24, 1995 [EP] European Pat. Off. ............. 95410003
Nov. 10, 1995 [EP] European Pat. Off. ............. 95410127

[51] Int. Cl.[6] ............................ H03K 17/94; H03M 11/00
[52] U.S. Cl. ........................... 341/22; 364/707; 395/750
[58] Field of Search ............................. 341/22; 364/707; 395/750

[56] References Cited

U.S. PATENT DOCUMENTS 4,999,794  3/1991  Yakushiji .................... 364/707
5,237,698  8/1993  Ohmae ...................... 395/750
5,384,721  1/1995  Joto ......................... 364/707
5,457,801  10/1995  Aihara ...................... 395/750

FOREIGN PATENT DOCUMENTS

A0230351  7/1987  European Pat. Off. ..
A056957  11/1993  European Pat. Off. ..

Primary Examiner—Thomas Mullen
Assistant Examiner—Timothy Edwards, Jr.

[57] ABSTRACT

A computer is provided with a power provisioning system for connection to an external power source and comprising a main power supply, a standby power supply, and control circuitry that selectively places the system in an ON state in which the main power supply is energised from the external power source and supplies power to main circuitry (C) of the computer, and a STANDBY state in which the standby power supply is energised from the external power source but the main power supply and the main circuitry (C) are de-energised. In order to make it easy for a user to ensure that the main cicuitry (C) is powered up, one of the standard keys of the computer keyboard, for example the space bar key, is provided with an additional set of contacts not associated with the key scanning arrangement of the keyboard. This additional contact set is directly connected to the control circuitry such that following operation of the switch the power provisioning system will reside in its ON state, regardless of its previous state.

18 Claims, 3 Drawing Sheets

COMPUTER KEYBOARD WITH POWER CONTROL KEY

TECHNICAL FIELD

The present invention relates to the control of a power provisioning system in a computer, such as a desktop computer, through the use of a key provided on the keyboard of the computer.

BACKGROUND ART

EP-A-0 567 957 A describes a computer with a power control unit that when connected to a power source can be placed in a run mode in which the computer is fully powered up, and a standby mode in which only part of the computer is powered, this part not including the microprocessor. The power control unit transitions from its run mode to its standby mode either automatically if no keyboard key is pressed for a predetermined time interval, or as a result of a user pressing a predetermined key of the keyboard. When the power control unit is in its standby mode, the pressing of any keyboard key transitions the power control unit to its run mode—however, if that key is detected as being continuously pressed, this is taken as indicating an unintentional key operation and the power control unit is returned to its standby mode.

It will be appreciated that in the foregoing arrangement, the keyboard controller must be kept powered in the standby mode in order to detect the pressing of any key.

It may also be noted that the problem of unintentional powering on of the computer is increased by having operation of any key cause such powering on. If operation of only one key resulted in powering on of the computer, then the risk of unintentional powering up of the computer would be reduced; however, this would also require interpretation of the key code output by the keyboard controller as this, in turn calls for energy-consuming circuitry.

It is an object of the present invention to overcome at least some of the above-described disadvantages of the prior art.

The present invention is described hereinafter in the context of (but not limited to) a computer with a power provisioning system including a small standby power supply as well as the main power supply. Such an arrangement is known in the art, the standby supply being intended to be energised from an external power source like the main supply of the computer but with the difference that the standby supply is always energised when the power lead is plugged into the external supply, regardless of the on/off state of what is presented to the user as the on/off switch of the computer. This standby supply powers the real time clock of the computer for as long as the power lead is plugged into the external power source, thereby reducing power drain on the internal battery normally provided for driving this clock when the main supply is powered down. In fact, it is also known to use this standby supply to power an electronic switch that controls the supply of power from the external power source to the main supply, this arrangement thereby avoiding the need to have the on/off switch operated by the user directly switch the external power source.

SUMMARY OF THE INVENTION

According to one aspect of the present invention, there is provided a keyboard comprising a key matrix having a plurality of keys each with a respective key switch operated by depression of the key; and scanning means for scanning the key matrix to detect operation of a said key switch and thereupon generate a keycode identifying that key; the keyboard further comprising:

a further switch operated by the depression of a said key, and means for enabling operation of said further switch to be detected independently of operation of the scanning means.

With such a keyboard, operation of the key (for example, the space bar) provided with the further switch can be detected even when the scanning means is de-energised; such an arrangement also avoids the need to provide an additional key to achieve independence.

Advantageously, the keyboard is used as part of a computer that has main circuitry, standby circuitry, and a power provisioning system for supplying electrical power to said main and standby circuitry; the power provisioning system having control means for causing the system to reside selectively in one of a first state in which it supplies said main circuitry, and a second state in which it supplies said standby circuitry but the main circuitry is de-energised; the control means including the further switch and said means for enabling operation of the further switch to be detected, and the control means being responsive to operation of the further switch when the power provisioning system is in its second state to place the system in its first state, but operation of the further switch when the power provisioning system is in its first state leaving the system in its first state.

With this arrangement, the user can be sure that after operating the further switch by pressing the relevant keyboard key, the computer will have its main circuitry powered up. By not involving the scanning means in this process, the control means can be kept simply as it does not have to interpret the key codes generated by the latter. Furthermore, the scanning means can be included as part of the main circuitry, being powered down when the power provisioning system is in its econd state.

The said further switch is preferably associated with a conveniently positioned standard key (by "standard" in this context is meant a key that is standardly provided on a keyboard such as an alphanumeric key, the space bar, one of the special purpose keys such as Enter, Shift, Ctrl, Alt, Esc, etc. or one of the arrow or function keys). Preferably, the further switch is associated with the space bar as this miminises the risk of an application program function being launched should the computer already be fully powered up when the space bar is pressed.

In one preferred embodiment, the power provisioning system comprisees a main power supply and a standby power supply. When the power provisioning system is in its first state, the main power supply is energised from the external power source and supplies the main circuitry. When the power provisioning system is in its second state, the standby power supply is energised from said external power source and supplies said standby circuitry but the main power supply is inoperative and the main circuitry is de-energised. The control means includes transition means for transitioning the power provisioning system between said states. The transition means includes, in addition to the further switch, a user-operable switch operation of which causes the current state of the power provisioning system to change to the other of said first and second states.

Advantageously, the control means includes memory means having set and reset states, and means responsive to the state of the memory means for placing the power provisioning system:

in its first state when the memory means is in its set state, and in its second state when the memory means is in its reset state;

the memory means having a set input for setting it in its set state and a clocking input successive inputs to which cause the memory means to toggle between its two states, said user-operable switch and said further switch respectively providing inputs to the clocking and set inputs of the memory means. Preferably, the memory means has a reset input for setting it in its reset state, and the main circuitry includes a microprocessor for producing a soft-off signal under program control, this soft-off signal being fed to the reset input of the memory means to place it in its reset state thereby causing the power provisioning system to reside in its second state.

BRIEF DESCRIPTION OF THE DRAWINGS

A desktop computer embodying the invention will now be particularly described, by way of non-limiting example, with reference to the accompanying diagrammatic drawings in which.

BEST MODE FOR CARRYING OUT THE INVENTION

General Arrangement

Figure 1:
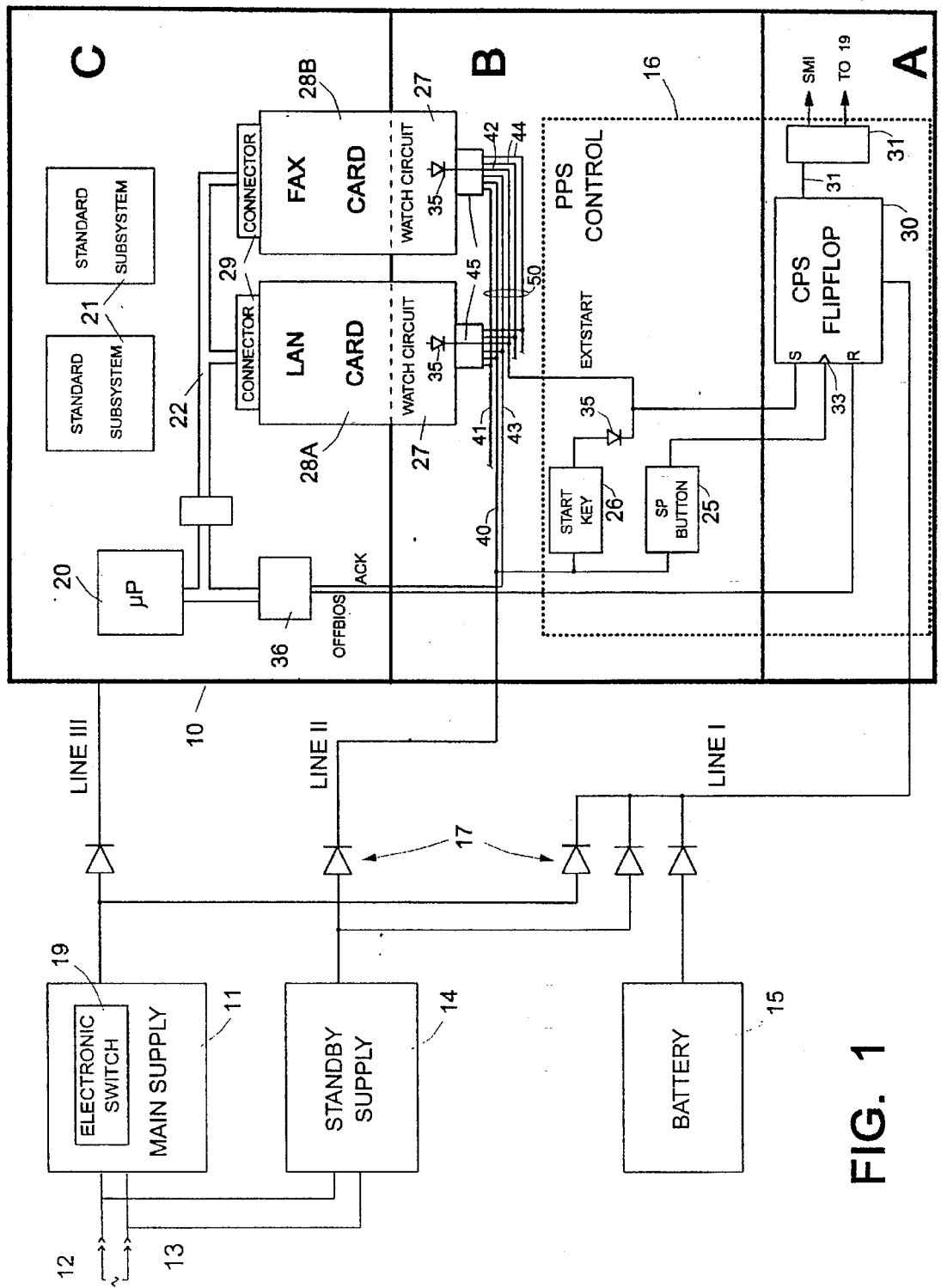
FIG. 1 is a diagram of the computer showing a power provisioning system for controlling the source of power supplied to different zones of the computer.

FIG. 1 shows in highly diagrammatic form a desktop computer, the right-hand side of FIG. 1 showing the electronic/electrical systems of the computer represented generally by box 10, whilst the left-hand side of FIG. 1 shows the three possible sources of supply-line voltage for powering the electronic/electrical systems 10. These three possible sources are:

- a main power-supply circuit 11 intended to be energised from an external power source is (here, the a.c. mains supply ) through an interruptable connection 13, such as a plug and socket;
- a standby power supply circuit 14, of lower power rating than the main supply circuit 11, also intended to be energised from the external power source 12 through the interruptable connection 13; and
- an internal power source 15 (here shown as a battery but possibly also a Goldcap—a large capacitor)

The main supply circuit 11 includes an electronic switch 19 that can be controlled to cut off the output of the supply circuit thereby rendering it inoperative to supply power to the system 10.

The main supply circuit 11, standby supply circuit 14, and battery 15 are all part of a power provisioning system of the computer, this system also including control circuitry (shown within the dotted box 16 and labelled "PPS Control" in FIG. 1) and an arrangement of diodes 17 through which the outputs of the supply circuits 11, 14 and of the battery 15 are connected to supply lines I, II, III. The overall arrangement is such that:

when the external power source 12 is disconnected (for example, by operation of the interruptable connection 13), line I is powered from battery 15, but lines II, III are de-energised;

when the external power source 12 is connected but the main supply circuit 11 is rendered inoperative by means of the electronic switch 19, lines I and II are energised from the standby supply circuit 14 whilst line III is de-energised; and when the external power source 12 is connected and the main supply circuit 11 operative, lines I and III are energised from the latter and line II is energised from the standby supply circuit 14.

The electronic/electrical systems 10 of the computer are divided into three zones A, B, C with each zone being powered over a corresponding one of the supply lines I, II, III (each line I, II, III may, in fact, be a set of lines depending on whether multiple supply voltages are required for powering the elements of a particular zone—however, for simplicity, the lines I, II, III will hereinafter be referred to as if they were single lines).

Zone A, supplied by line I, contains elements that need to be kept energised even when the external power source 12 is disconnected.

Zone B contains elements which provide standby functionality, watching and waiting for some trigger event indicating that the main elements of the computer should be powered up. Elements in zone B are powered via line II, being powered from the standby supply circuit 14 when the external power source 12 is connected but the main supply circuit 11 is inoperative.

Zone C contains the main elements of the computer such as a microprocessor 20, standard sub-systems 21 (such as RAM, ROM, disc drives), an expansion bus 22, etc. Effective operation of the computer requires energisation of the zone C elements, this being effected over line III when the main supply circuit 11 is rendered operative.

Operating States

Figure 2:
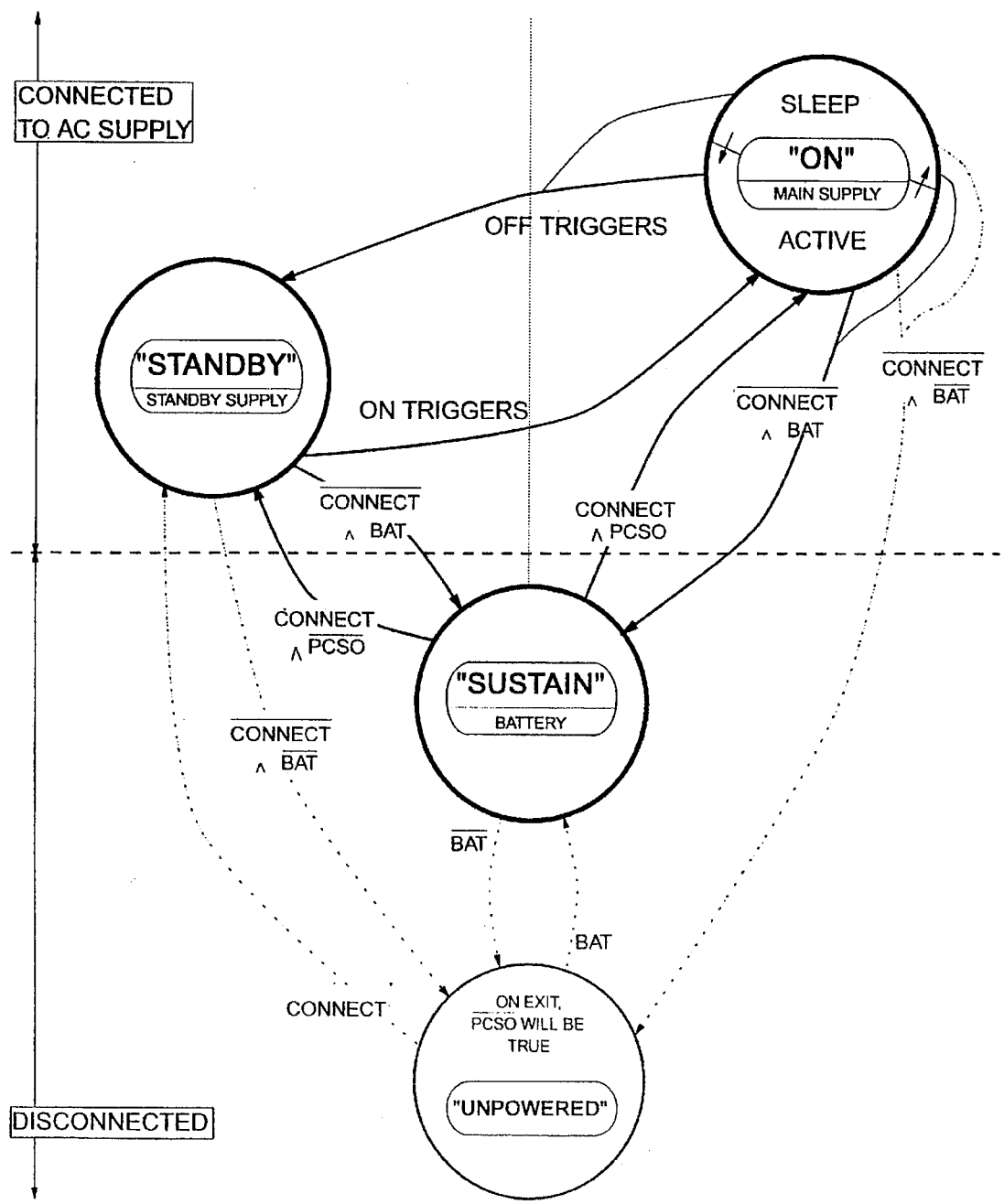
FIG. 2 is a state transition diagram showing the main operating states of the FIG. 1 power provisioning system.

The power provisioning system can be considered as having four main operating states as depicted in the state transition diagram of FIG. 2, these state being:

UNPOWERED—This is the state in which the system resides when the external power source 12 is disconnected and there is no internal power source 15 or the latter is fully discharged. In this state, none of the lines I, II, III is energised SUSTAIN—The system resides in this state when the external power source 12 is disconnected but there is an operative internal power source 15. In this state, line I is energised from the source 15 (battery) thereby energising zone A.

STANDBY—This is the state in which the system resides when the external power source 12 is connected but the main power supply circuit is inoperative. In this state, lines I, II are energised from the standby supply circuit 14 thereby energising zones A and B.

ON—The system resides in this state when the external power source 12 is connected and the main supply 11 is operative. In this state, all three lines I, II, III are energised thereby energising all three zones A, B, C.

When the power provisioning system is in its ON state, the computer may operate a power management process in which certain components of the computer are powered down if not used for a predetermined period, these components being subsequently powered up again as soon as required. This reduced power mode is termed a 'sleep' mode as opposed to the normal 'active' mode of operation of the computer. The transition between these modes is controlled by the microprocessor 20 under program control, the microprocessor 20 remaining powered in both modes. This power management process effected under program control is of a different nature to the functionality provided by the power provisioning system where the source of power is being changed to meet current circumstances.

Transition between the states of the FIG. 2 state diagram depends on:

(i)—connection (CONNECT) and disconnection ($\overline{\text{CONNECT}}$) events, that is, connection and disconnection of the external power source 12;

(ii)—battery status (good battery status being represented by BAT and a discharged or absent battery by $\overline{\text{BAT}}$);

(iii)—'on' and 'off' triggers for transitioning between the STANDBY and ON states when the power source 12 is connected;

(iv)—the most recent connected state (STANDBY or ON) at the time the power source 12 is disconnected (a previous connected state of ON is represented by PCSO whereas a previous connected state of STANDBY is represented by $\overline{\text{PCSO}}$).

Starting with the STANDBY state, if an On Trigger is received, the power provisioning system will transit to its ON state and similarly, if an Off Trigger is received when the system is in its ON state it will transit back to its STANDBY state.

If the battery 15 is good (BAT), disconnection of the external power source 12 ($\overline{\text{CONNECT}}$), will move the system from its current connected state (ON or STANDBY) to the SUSTAIN state. On reconnection (CONNECT), the system will move from the SUSTAIN state to the STANDBY or ON state depending on whether the previous connected state corresponds to PCSO or $\overline{\text{PCSO}}$.

If the battery 15 is discharged ($\overline{\text{BAT}}$) when a disconnection event occurs ($\overline{\text{CONNECT}}$), the system will move to the UNPOWERED state. On reconnection, in practice it is not possible to restore the system to its previous connected state because the latter cannot easily be memorised in the absense of any power whilst the system was in its UNPOWERED state; accordingly, on reconnection, the system is arranged to default to the STANDBY state. The same is true if the battery 15 is replaced prior to reconnection, the system moving first from the UNPOWERED state to the SUSTAIN state and then to the STANDBY state.

Considering next the form of the On and Off Triggers, these are as follow:

On Triggers:
(i) user operation of a status panel button 25 powered from line II;
(ii) user operation of a start key 26 also powered from line II;
(iii) generation of an external start signal EXTSTART by watch circuits 27 provided on expansion cards 28

Off Triggers:
(i) operation of the status panel button 25
(ii) generation under program control of a signal OFF-BIOS.

The provision of these triggers will be described more fully below but first the manner in which the PPS control 16 operates to implement the FIG. 2 state diagram will be outlined. In fact, the PPS control only has to concern itself with transitions to and between the connected states (STANDBY and ON) since transition to and between the disconnected states is substantially automatic given the FIG. 1 architecture.

PPS Control

The PPS control 16 has three main functions, these being to set up the power provisioning system to provide an output corresponding to its current connected state, to transition the system between its connected states, and to remember the previous connected state upon disconnection of the external power source.

All three functions can conveniently be implemented around a single flipflop 30 whose 'set' and 'reset' states respectively represent the ON and STANDBY states. When flipflop 30 is in its set state it produces a logical '1' (corresponding to PCSO) on output line 31 and this is processed by conditioning circuitry 32 to operate the electronic switch 19 so as to render the main power supply circuit 11 operative; when the flipflop 30 is in its reset state, the output line 31 is at logical '0' (corresponding to $\overline{\text{PCSO}}$) and the switch 19 is set to render the main supply inoperative.

The flipflop 30 has a set input S, a reset input R and a clocking input 33. The clocking input serves to toggle the state of the flipflop at each input whilst inputs to the set and the reset inputs respectively set the flipflop 30 in its set and reset states.

The status panel button 25 is connected to the clocking input 33 and thus each operation of this button whilst the external power source is connected serves to change the current state of the power provisioning system to the other of the two connected states STANDBY and ON.

The start key 26 and a line carrying EXTSTART signals are connected to the set input of flipflop 30 to cause the power provisioning system to move into its ON state from its STANDBY state. The start key 26 and the EXTSTART signal sources on the cards 28 are isolated one from another by isolating diodes 35, the diodes 35 associated with the EXTSTART signal sources being provided on the corresponding cards thereby enabling a single line to be used to carry the EXTSTART signal from the cards.

The OFFBIOS signal is fed to the reset input of flipflop 30 to cause the power provisioning system to move into its STANDBY state from its ON state.

The flipflop 30 is powered from line 30 and therefore, if the battery 15 is good, flipflop 30 will retain its state on disconnection of the external power source 12, this state corresponding to the current connected state, ON or STANDBY, at the time of disconnection. In contrast, all the On and Off triggers require the external power source 12 to be connected in order to be generated; as a result, the state of flipflop 30 will not be changed whilst the system is in its SUSTAIN state.

Upon re-connection of the external power source 12, the power provisioning system will be placed in its STANDBY or ON state depending on the current state of flipflop 30 and thus upon the system state immediately prior to the preceding disconnection of the external power supply 12.

The provision of the On and Off triggers will now be considered in more detail.

Status Panel Button

The status panel button 25 serves as the standard on/off button for the computer and is provided on a status panel that forms part of the front of the processor box of the computer. As already described, successive operation of the button 25 toggles the power provisioning system between its STANDBY and ON states when the external power source is connected.

Start Key

It is not always convenient for a user to operate the status panel button to turn the computer "on"—for example, the processor box mounting the button 25 may be stored away beneath a desktop. It is for this reason that the start key 26 is provided, this key 26 being positioned on a keyboard of the computer so that it will always be readily accessible to the user. It may be noted that providing the status panel button 25 on the keyboard to facilitate access is not an acceptable solution because this would make it far too easy for the user to inadvertently power down the computer into the STANDBY state of the power provisioning system.

Figure 3:
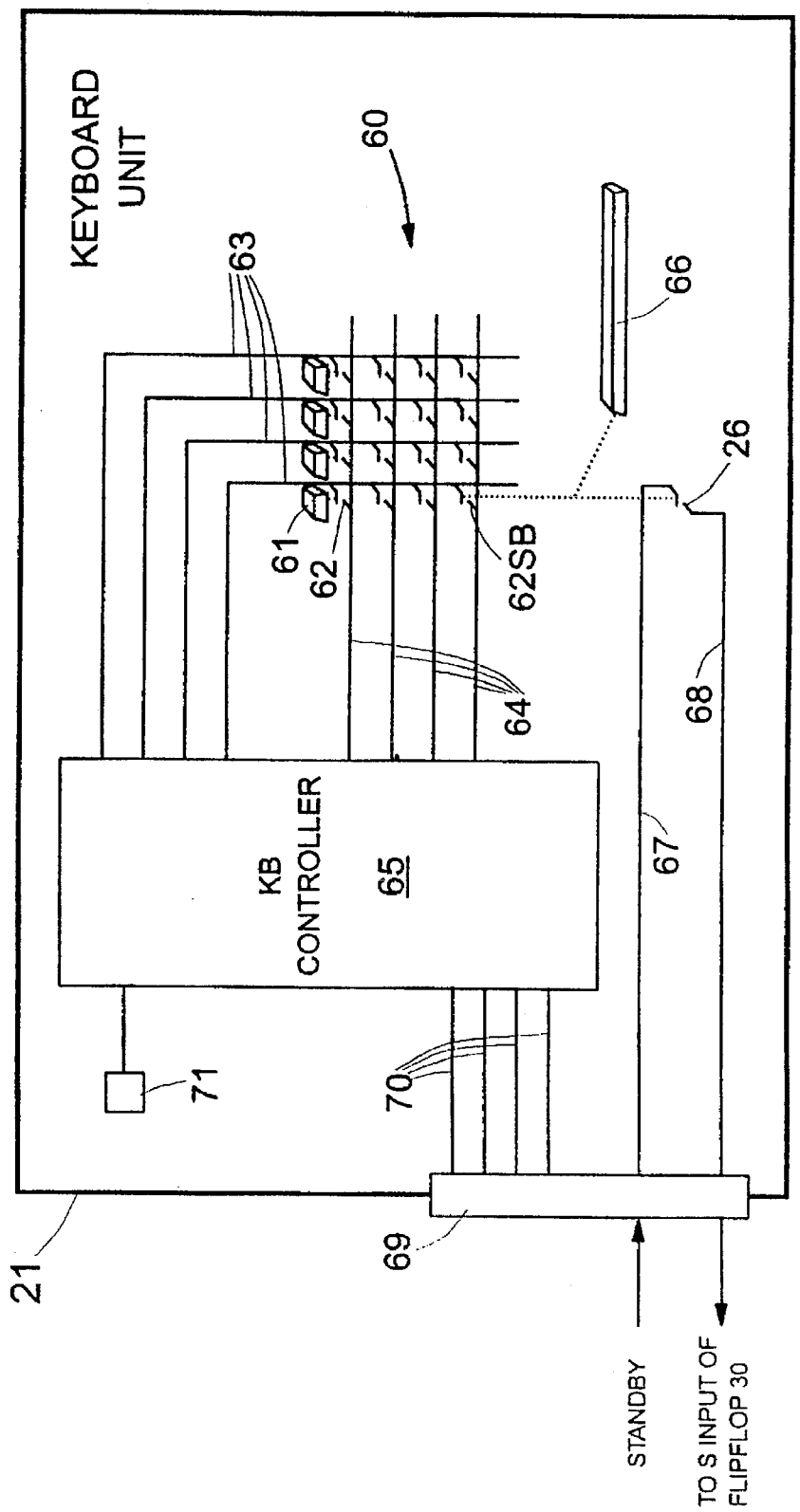
FIG. 3 is a diagram of a keyboard unit of the FIG. 1 computer.

FIG. 3 shows in diagrammatic form the keyboard unit of the computer, this unit being referenced 21 as for the most part it takes the form of a standard subsystem of the computer which is powered down when the main supply is inoperative. More particularly, the keyboard unit comprises a key matrix 60 having a plurality of keys 61 (only some of which are shown) each with an associated keyswitch 62. The keyswitches 61 are disposed to connect respective pairs of column and row lines 63, 64 when operated. The lines 63 and 64 are connected to a keyboard controller 65 which scans these lines in standard manner to detect a key press (thus, each column line may be successively energised at a logic level '1' for a respective period during each of which the row lines are scanned, detection of a logic level '1' on a particular row indicating that the key at the intersection of that row and the energised column has been pressed). For each key press the keyboard controller generates a keycode indicative of the pressed key and this keycode is then output to the microprocessor 20 over lines 70 via the keyboard connector 69 (this output process being inititated by an interrupt generated by the keyboard controller). The keyboard controller 65 forms part of the zone C circuitry and is powered, via lines 70, only when the power provisioning system is in its ON state with the main supply operative.

The start key takes the form of an additional contact set 26 associated with the space bar 66 of the keyboard, this additional contact set serving as a switch that is operated jointly with the keyswitch 62SB of the space bar 66 when the later is pressed. However, whereas the keyswitch 62SB forms part of the matrix 60 scanned by the keyboard controller 65, the switch 26 is connected by lines 67, 68 directly to the connector 69 to enable operation of the switch 26 to be detected independently of the functioning of the keyboard controller 65. Line 67 is connected to the standby voltage line 40 and line 68 is connected to the set input of flipflop 30. As a result, when the power provisioning system is in its STANDBY state (in which the keyboard controller is de-energised), pressing the space bar 66 will result in a signal being fed to the set input of the flipflop 30 to set the power provisioning system in its ON state. A user returning to the computer thus need only press the space bar to ensure that the power provisioning system is in its ON state (assuming the external source 12 is connected); the user need not concern himself/herself with the current state of the system immediately prior to pressing the space bar since regardless of whether the system is in its ON or STANDBY state, after pressing the spacebar, the system will be in its ON state. If the power provisioning system was in fact in its ON state when the space bar is pressed, the fact that a "space" input will be processed by the microprocessor 20 will generally be irrelevant as a 'space' input is normally insufficient to cause initiation of predetermined functions in application software.

Although the above-described keyboard is of the type which is physically distinct from the main processor box of the computer, it will be appreciated that the start key can also be provided on a keyboard that is integral with the processor box (such as is generally the case with a portable computer).

OFFBIOS Signal

The Off trigger constituted by the OFFBIOS signal is a software generated trigger which, for example, is initiated by the user clicking on a displayed 'off' icon. At a hardware level, upon the microprocessor 20 acting under program control determining that the power provisioning system is to be set into its STANDBY state, it addresses an appropriate output to conditioning circuitry 36 that generates the OFFBIOS signal for passing to the reset input of the flipflop 30.

EXTSTART and Watch Circuits

Turning now to the generation of the EXTSTART On trigger, this is generated by the watch circuitry 27 provided on the expansion card 28. These cards 28, are, for example, a LAN card 28A and a fax card 28B respectively connected to a LAN and to a telephone line. Each card 28A, 28B is inserted into a standard expansion slot (connector 29) of the expansion bus 22, the latter typically being in conformity with the ISA, EISA or PCI bus standard and including a set of supply lines energised over line III. The cards 28A, 28B respectively include the normal circuitry for interfacing with a LAN and for sending and receiving faxes, this circuitry being powered from the supply lines of the expansion bus 22 via connectors 29; as a result, the normal card circuitry is only powered when the power provisioning system is in its ON state.

In contrast, the watch circuits 27 are powered over supply line 40 energised from line II and are therefore live whenever the external power source 12 is connected; in particular, the watch circuits 27 are energised from the standby supply 14 when the power provisioning system is in its STANDBY state and the normal circuitry of the cards 28A, 28B is de-energised. A ground line 41 is associated with the line 40 and is connected to the watch circuits 27.

The watch circuit 27 of the LAN card 28A monitors the traffic on the associated LAN and upon detecting a special start-up message addressed to the computer, outputs an EXTSTART signal on line 42. The watch circuit 27 of the Fax card 28B is responsive to an incoming fax to output on EXTSTART signal also on line 42. Other watch circuits on other expansion cards may also be provided.

As already noted, the EXTSTART signal sets the flipflop 30 in its 'set' state, thereby causing the power provisioning system to transit to its ON state. This results in the main computer circuitry in zone C being powered up including the rest of the circuitry on the cards 28A, 28B and the microprocessor 20. Once the main computer circuitry is powered up, it will respond to the external event (start-up message/incoming fax) that triggered the generation of the EXTSTART signal, the nature of this response being under program control. However, in all cases the microprocessor 20 is preferably arranged to generate, under BIOS control, an acknowledgement signal ACK that is fed back on line 43 to the watch circuits 27. In this manner the watch circuit that generated the EXTSTART signal will quickly know if it has successfully caused power on of the main circuitry; if no acknowledgment is received after a predetermined time, the watch circuit is in any case arranged to remove the EXTSTART signal. If this were not done, the EXTSTART signal could remain asserted, preventing power off of the computer. In one implementation, the output of each watch circuit is provided via a flipflop that is placed in a 'set' state, outputting an EXTSTART signal, upon the watch circuit detecting an external trigger event; this flipflop is subsequently reset by the ACK signal, thereby removing the EXTSTART signal.

It should be noted that whilst the watch circuit 27 and the other circuitry on each expansion card 28 are served by separate power supply lines, when the power provisioning system is in its ON state and the card is fully powered the watch circuit 27 can communicate with the other circuitry on the card and with the expansion bus signal lines (data, address and control bus lines). As a result, it is possible for the watch circuit to be initialised to a predetermined condition when the STANDBY state is entered from the ON state. This is achieved by having the circuitry 32 generate a system management interrupt SMI upon line 31 moving to logical '0', this interrupt being serviced by the microprocessor 30 in the usual manner and resulting in an initialisation routine being run to initialise the watch circuits 27 on the expansion cards 28. Of course, in order to do this, the microprocessor must remain powered up and therefore operation of the switch 19 to inhibit the main supply 11 must be delayed. This can be achieved either by introducing a simple fixed delay in circuitry 32 to delay operation of switch 19 for a fixed time after generation of the interrupt, or by having operation of switch 19 to inhibit the supply 11 controlled by the microprocessor itself, the switch 19 only be operated once the initialisation routine has been completed.

It should be noted that although the expansion bus signal lines can be used for exchanging signals with the watch circuits when the power provisioning system is in its ON state, the watch circuits must avoid placing signals on the expansion bus lines in the other states of the power provisioning system since in such states the microprocessor 20 and its associated circuitry will not be powered and could be damaged by signals on the bus 22.

The lines 40 to 43 that supply power to the watch circuits 27 and carry the EXTSTART and ACK signals together effectively constitute a bus 50 additional to the standard expansion bus 22, this additional bus 50 (herein, the "start" bus) connecting to the cards 28 through connectors 45. The start bus 50 may be implemented in a number of different ways; for example, the bus 50 may be implemented as a daisy chain jumping from one connector 45 to the next, as separate flying-lead connectors to each expansion card 28, or as a plurality of connectors provided along the same ribbon cable.

Although the start bus 50 and connectors 45 are shown as physically separate from the expansion bus 22 and connectors 29, it would be possible to integrate the two buses and connectors. However, as a practical matter, this may not be considered desirable because of the fact that the expansion bus 22 and connectors 29 will generally be standardised on ISA, EISA or PCI and it would be impractical to alter this standard part of the computer.

The expansion cards 28 may also be provided with circuitry responsive to external events to wake up the computer from its "sleep" mode as part of the power management scheme operated under the control of the microprocessor 20. This wake-up circuitry will generally be closely associated with the watch circuits as much of its functionality is similar to that of the latter. The wake-up circuitry is effective when the power provisioning system is in its ON state but the computer is in its sleep mode, to generate a system management interrupt on line 44 in response to predetermined external events, this interrupt being supplied to the microprocessor 20 and causing the latter to change the computer to its active mode. To facilitate the rapid detection of the source of the interrupt by the interrupt handler, rather than having the cards 28 share a common line 44 (through isolating diodes), a respective line 44 is preferably provided for each different wake-up interrupt, each card having appropriate jumpers to select which wake-up interrupt line 44, if any, it is to utilise.

The line or lines 44 are preferably provided as part of the start bus 50.

Variants

It will be appreciated that many variants are possible to the above-described system. For example, in relation to the main and standby power supplies 11 and 14, although these are shown as completely separate in FIG. 1, they may share a common transformer primary and core. Again, with respect to the electronic switch 19 used to control the main power supply 11, this can be provided anywhere in relation to the circuitry of the power supply so long as it is effective to render the supply inoperative to energise line III.

As regards the operating states of the power provisioning system, a more complicted state machine may be implemented particularly where it is desired to build in certain security features. For example, a user may be required to have entered a pasword at the keyboard of the computer before the latter is rendered operable, either on first start up or following the user having "locked" the computer so that it does not respond to keyboard and mouse input. In this case, in order to avoid prejudicing system security, whenever the ON state is entered, the user should be required to enter the correct password before using the computer; in cases where the On trigger is user-generated, the password may be called for before the computer is booted locally, whereas if the On trigger is an EXSTART signal, the computer is preferably booted over the network to enable it to respond to the external event that caused the watch circuits to generate the EXSTART signal, the keyboard and mouse remaining inoperative until the user enters the correct password. The extra states required to implement such an arrangement are all sub-states of the macro ON state.

We claim:

1. A keyboard comprising a key matrix having a plurality of keys each with a respective key switch operated by depression of the key; and scanning means for scanning the key matrix to detect operation of a said key switch and thereupon generate a keycode identifying that key; characterised in that the keyboard further comprises:

a further switch operated by the depression of a said key, and means for enabling operation of said further switch to be detected independently of operation of the scanning means.

2. A keyboard according to claim 1, further comprising an electrical connector for connecting the keyboard to a data processing system, said means for enabling operation of said further switch to be detected comprising first and second electrical lines connected to the electrical connector and across which said further switch is electrically disposed.

3. A computer with a keyboard according to claim 2, the computer having main circuitry, standby circuitry, and a power provisioning system for supplying electrical power to said main and standby circuitry; the power provisioning system having control means for causing the system to reside selectively in one of a first state in which it supplies said main circuitry, and a second state in which it supplies said standby circuitry but said main circuitry is de-energised; the control means including said further switch and said means for enabling operation of said further switch to be directed, and the control means being responsive to operation of said further switch when the power provisioning system is in its second state to place the system in its first state, but operation of said further switch when the power provisioning system is in its first state leaving the system in its first state.

4. A computer with a keyboard according to claim 2, the computer having main circuitry, standby circuitry, and a power provisioning system connectable to an external power source; the power provisioning system comprising:

a main power supply, a standby power supply; and control means which with the power provisioning system connected to said external power source, causes the system to reside selectively in one of a first state in which the main power supply is energised from the external power source and supplies said main circuitry, and a second state in which the standby power supply is energised from said external power source and supplies said standby circuitry but the main power supply is inoperative and said main circuitry is de-energized;

the control means including transition means for transitioning the power provisioning system between said states, the transition means including:

a user-operable switch operation of which causes the current state of the power provisioning system to change to the other of said first and second states, said further switch and said means for enabling operation of said further switch to be detected, operation of said further switch when the power provisioning system is in its second state causing the control means to place the system in its first state, but operation of said further switch when the power provisioning system is in its first state leaving the system in its first state.

5. A keyboard unit according to claim 1, wherein said key provided with the further switch is a space bar key.

6. A computer with a keyboard according to claim 5, the computer having main circuitry, standby circuitry, and a power provisioning system for supplying electrical power to said main and standby circuitry; the power provisioning system having control means for causing the system to reside selectively in one of a first state in which it supplies said main circuitry, and a second state in which it supplies said standby circuitry but said main circuitry is de-energised; the control means including said further switch and said means for enabling operation of said further switch to be directed, and the control means being responsive to operation of said further switch when the power provisioning system is in its second state to place the system in its first state, but operation of said further switch when the power provisioning system is in its first state leaving the system in its first state.

7. A computer with a keyboard according to claim 5, the computer having main circuitry, standby circuitry, and a power provisioning system connectable to an external power source; the power provisioning system comprising:

a main power supply, a standby power supply; and control means which with the power provisioning system connected to said external power source, causes the system to reside selectively in one of a first state in which the main power supply is energised from the external power source and supplies said main circuitry, and a second state in which the standby power supply is energised from said external power source and supplies said standby circuitry but the main power supply is inoperative and said main circuitry is de-energized;

the control means including transition means for transitioning the power provisioning system between said states, the transition means including:

a user-operable switch operation of which causes the current state of the power provisioning system to change to the other of said first and second states, said further switch and said means for enabling operation of said further switch to be detected, operation of said further switch when the power provisioning system is in its second state causing the control means to place the system in its first state, but operation of said further switch when the power provisioning system is in its first state leaving the system in its first state.

8. A computer with a keyboard according to claim 1, the computer having main circuitry, standby circuitry, and a power provisioning system for supplying electrical power to said main and standby circuitry; the power provisioning system having control means for causing the system to reside selectively in one of a first state in which it supplies said main circuitry, and a second state in which it supplies said standby circuitry but said main circuitry is de-energised; the control means including said further switch and said means for enabling operation of said further switch to be detected, and the control means being responsive to operation of said further switch when the power provisioning system is in its second state to place the system in its first state, but operation of said further switch when the power provisioning system is in its first state leaving the system in its first state.

9. A computer according to claim 8, wherein said scanning means of the keyboard forms part of said main circuitry.

10. A computer with a keyboard according to claim 1, the computer having main circuitry, standby circuitry, and a power provisioning system connectable to an external power source; the power provisioning system comprising:

a main power supply, a standby power supply, and control means which with the power provisioning system connected to said external power source, causes the system to reside selectively in one of a first state in which the main power supply is energised from the external power source and supplies said main circuitry, and a second state in which the standby power supply is energised from said external power source and supplies said standby circuitry but the main power supply is inoperative and said main circuitry is de-energised;

the control means including transition means for transitioning the power provisioning system between said states, the transition means including:

a user-operable switch operation of which causes the current state of the power provisioning system to change to the other of said first and second states, said further switch and said means for enabling operation of said further switch to be detected, operation of said further switch when the power provisioning system is in its second state causing the control means to place the system in its first state, but operation of said further switch when the power provisioning system is in its first state leaving the system in its first state.

11. A computer according to claim 10, wherein said scanning means of the keyboard forms part of said main circuitry.

12. A computer according to claim 10, wherein said control means includes memory means having set and reset states, and means responsive to the state of said memory means for placing the power provisioning system:

in its first state when the memory means is in its set state, and in its second state when the memory means is in its reset state; the memory means having a set input for setting it in its set state and a clocking input successive inputs to which cause the memory means to toggle between its two states, said user-operable switch and said further switch respectively providing inputs to said clocking and set inputs of the memory means.

13. A computer according to claim 12, wherein the memory means has a reset input for setting it in its reset state, and said main circuitry includes a microprocessor for producing a soft-off signal under program control, said soft-off signal being fed to the reset input of said memory means to place it in its reset state thereby causing the power provisioning system to reside in its second state.

14. A computer having main circuitry, standby circuitry, a keyboard having a plurality of standard keys, and a power provisioning system connectable to an external power source; the power provisioning system comprising:

a main power supply, a standby power supply, and control means which with the power provisioning system connected to said external power source, causes the system to reside selectively in one of a first state in which the main power supply is energised from the external power source and supplies said main circuitry, and a second state in which the standby power supply is energised from said external power source and supplies said standby circuitry but the main power supply is inoperative and said main circuitry is de-energised, the control means including transition means for transitioning the power provisioning system between said states, the transition means including a first user-operable switch operation of which causes the current state of the power provisioning system to change to the other of said first and second states, characterised in that the transition means further comprises a second user-operable switch in the form of a dedicated pair of switch contacts associated with a said standard key of said keyboard, operation of the second switch when the power provisioning system is in its second state causing the control means to place the system in its first state, but operation of the second switch when the power provisioning system is in its first state leaving the system in its first state.

15. A computer according to claim 14, wherein the said standard key with which said dedicated pair of switch contacts is associated is the space bar of the keyboard.

16. A computer according to claim 14, wherein said keyboard includes a keyboard controller for scanning the keyboard keys to detect depression of any said key, the keyboard controller forming part of said main circuitry.

17. A computer according to claim 14, wherein said control means includes memory means having set and reset states, and means responsive to the state of said memory means for placing the power provisioning system:

in its first state when the memory means is in its set state, and in its second state when the memory means is in its reset state;

the memory means having a set input for setting it in its set state and a clocking input successive inputs to which cause the memory means to toggle between its two states, said first and second user-operable switches respectively providing inputs to said clocking and set inputs of the memory means.

18. A computer according to claim 17, wherein the memory means has a reset input for setting it in its reset state, and said main circuitry includes a microprocessor for producing a soft-off signal under program control, said soft-off signal being fed to the reset input of said memory means to place it in its reset state thereby causing the power provisioning system to reside in its second state.

* * * * *